May 29, 1934.   M. A. BALAAM ET AL   1,960,472
IRRIGATING SYSTEM
Filed Sept. 2, 1930
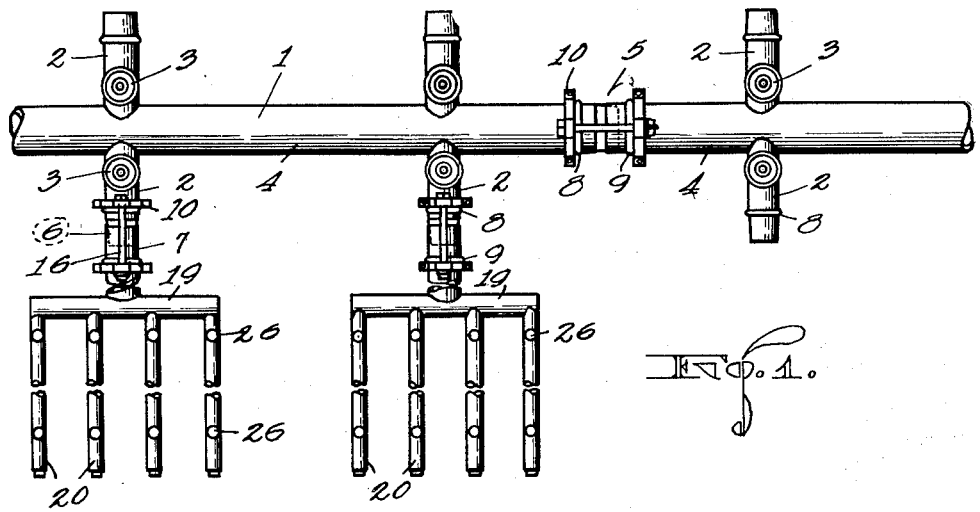
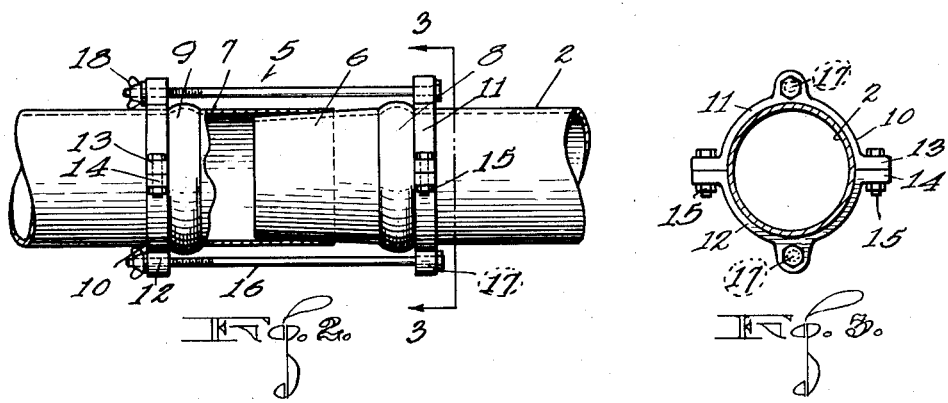
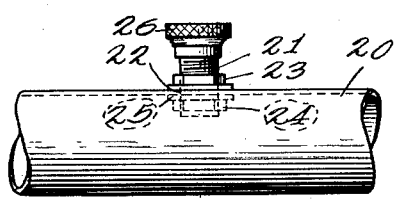
INVENTORS.
MAURICE A. BALAAM.
VERN BALAAM.
BY Munn & Co.
ATTORNEYS.

Patented May 29, 1934

1,960,472

UNITED STATES PATENT OFFICE 1,960,472

IRRIGATING SYSTEM

Maurice A. Balaam and Vern Balaam, Lompoc, Calif., assignors of one-third to A. G. Balaam, Lompoc, Calif.

Application September 2, 1930, Serial No. 479,320

3 Claims. (Cl. 299—58)

The present invention relates to improvements in irrigating systems and its principal object is to provide a convenient means for distributing water from a source over an area of land, the system being arranged in such a manner that it may be readily removed after the water has been distributed so as to leave the field entirely clear for cultivating purposes.

More particularly it is proposed in the present invention to provide a removable surface irrigating system and to provide special pipe sections that may be easily and quickly assembled into a complete system.

It is further proposed in the present invention to provide a system of the character described which has suitable mains and branches whereby the water may be evenly distributed over the selected area.

It is a further object of the present invention to provide, in connection with this system, suitable sprinkler-heads forming a more or less permanent part of the pipe sections used in our system.

Further objects and advantages of our invention will appear as the specification proceeds.

The preferred form of our invention is illustrated in the accompanying drawing in which:

Figure 1 shows a portion of our system in top plan view,

Figure 2 a detail view in top plan of a connection between two adjacent pipe sections, Figure 3 a cross section taken along line 3—3 of Figure 2, and Figure 4 a detail view in elevation showing a sprinkler head attached to a pipe section.

While we have shown only the preferred form of the invention, we wish to have it understood that various changes or modifications may be made within the scope of the claims hereto attached without departing from the spirit of the invention.

In its preferred form, our invention comprises a main pipe 1, which has a plurality of branch pipes 2 extending therefrom in spaced relation, the branch pipes being preferably arranged in pairs and suitable valves 3 being provided for controlling the branch pipes. The main pipe, which is adapted for connection to a suitable source of water and which is intended to lie on the ground surface, consists of a plurality of sections 4, which are detachable, fastened to one another as shown at 5 and in the enlarged detail view of Figure 2. Each pipe section has a tapered end 6 adapted for telescoping into the straight end 7 of the adjacent pipe and each pipe is also provided with two beads 8 and 9, the former being at the base of the tapered portion and the latter at a distance from the opposite end substantially equal to the length of the tapered portion. A clamp 10, consisting preferably of two semi-circular sections 11 and 12 having confronting flanges 13 and 14 adapted to be clamped together by means of bolts 15, is fastened to the pipe section adjacent to the bead 8 and a second clamp of the same construction is fastened to the adjacent pipe section behind its bead 9, and the two clamps may be drawn together by means of bolts 16 extending through registering perforations 17 of the two clamps, the bolts being provided with suitable wing nuts 18. It will be seen that in this manner the two pipe sections may be drawn together so as to form a water-tight unit.

The main pipe may consist of any number of these sections according to the size of the field to be irrigated, and each preferably has a number of branch pipes 2 extending therefrom in the manner shown in Figure 1, the branch pipes terminating in tapered ends and having beads back of the tapers in the manner previously described so as to be adapted to have additional pipe sections fastened thereto on the principle illustrated in Figure 2.

The pipe sections fastened to the branches 2 may be ordinary single sections forming mere extensions of the branches but are preferably made in the form shown in Figure 1 so as to present cross-heads 19 which have a number of distributing pipes 20 extending therefrom whereby the water is more evenly distributed over the area. Each of these distributing pipes preferably is provided with a number of sprinklers, one of which is illustrated in detail in Figure 4. These sprinklers are preferably made as simply as possible and comprise a short tube 21 having an outer face threaded throughout its length and adapted to be secured into the wall of the distributing pipe as shown at 22. This tube is firmly locked upon the pipe wall by means of nuts 23 and 24 while washers 25 are interposed between the nuts and the pipe wall to render the connection water-tight. A suitable sprinkler-head 26 is threaded on the tube 21.

The advantages and the manner of using our system will be readily understood from the foregoing description. The principal idea of the invention being to create a temporary distributing system that may be quickly applied and quickly removed, it is apparent that the connecting means between the different pipe sections should be such as to lend itself to rapid assembling and disassembling. In our system the pipe sections, as shown in the drawing, may be quickly distributed over the field to be irrigated and connections may be rapidly established by telescoping the tapered ends of the sections into the straight ends of adjacent sections and by tightening the wing nuts 18. As soon as this operation is performed the system is ready for use and when the water is turned on it will be evenly distributed over the entire area. It is obvious that the coupling between any two sections of pipe allows of slight angular relationship between the sections and that therefore the entire length of the pipe may adjust itself to some extent to an uneven or rolling surface. After the irrigation is completed the pipe sections may be disconnected, as rapidly as they were connected, and carried off the field so that the entire field is then free for cultivating purposes.

We claim:

1. An irrigating apparatus comprising a conduit consisting of pipe sections, yieldable and detachable coupling means connecting the ends of adjacent pipe sections and enabling the laying of the conduit on undulating land surfaces and enabling its disposition in sinuous formation over said surfaces, a valved branch issuing from each pipe section, a cross-head flexibly connected to each valved branch and communicating with a plurality of nozzled conduits.

2. Irrigating apparatus comprising a conduit consisting of pipe sections, yieldable and detachable coupling means connecting the ends of adjacent pipe sections and enabling the laying of the conduit on undulating land surfaces and enabling its disposition in sinuous formation over said surfaces, valved branches issuing from different sections of the conduit and a cross head detachably and flexibly connected with at least one of the valved branches and communicating with a plurality of nozzled conduits.

3. Irrigating apparatus comprising a conduit consisting of pipe sections, yieldable and detachable coupling means connecting the ends of adjacent pipe sections and enabling the laying of the conduit on undulating land surfaces and enabling its disposition in sinuous formation over said surfaces, valved branches issuing from different sections of the conduit, and an additional pipe unit detachably and flexibly connected with at least one of the valved branches and communicating with a plurality of nozzled conduits.

MAURICE A. BALAAM.
VERN BALAAM.